US008306270B2

(12) United States Patent
Sato

(10) Patent No.: US 8,306,270 B2
(45) Date of Patent: Nov. 6, 2012

(54) VEHICLE TRAVEL SUPPORT DEVICE, VEHICLE, VEHICLE TRAVEL SUPPORT PROGRAM

(75) Inventor: Hidenori Sato, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 386 days.

(21) Appl. No.: 12/809,769

(22) PCT Filed: Jan. 9, 2009

(86) PCT No.: PCT/JP2009/000071
§ 371 (c)(1),
(2), (4) Date: Jun. 21, 2010

(87) PCT Pub. No.: WO2009/116221
PCT Pub. Date: Sep. 24, 2009

(65) Prior Publication Data
US 2011/0044503 A1 Feb. 24, 2011

(30) Foreign Application Priority Data
Mar. 21, 2008 (JP) ................................ 2008-073842

(51) Int. Cl.
*G06K 9/00* (2006.01)
*G06K 9/48* (2006.01)
*G06K 9/36* (2006.01)
(52) U.S. Cl. .......................... 382/104; 382/199; 382/281
(58) Field of Classification Search .................. 382/103, 382/104, 106, 107, 199, 266, 270, 276, 281
See application file for complete search history.

(56) References Cited

U.S. PATENT DOCUMENTS 4,970,653 A * 11/1990 Kenue ............................ 701/301
5,922,036 A * 7/1999 Yasui et al. ...................... 701/28

FOREIGN PATENT DOCUMENTS

| JP | 2003-255047 A | 9/2003 |
|---|---|---|
| JP | 2005-275691 A | 10/2005 |
| JP | 2005-308437 | 11/2005 |
| JP | 2006-308514 A | 11/2006 |
| JP | 2008-027046 | 2/2008 |

* cited by examiner

*Primary Examiner* — Brian Le
(74) *Attorney, Agent, or Firm* — Carrier Blackman & Associates, P.C.; Joseph P. Carrier; William D. Blackman

(57) ABSTRACT

A vehicle travel support device determines presence of a recognition inhibiting factor of a lane mark on a road on which a vehicle is traveling with high accuracy irrespective of an imaging history by a vehicular camera from the same position. The vehicle travel support system generates an edge image by extracting an edge or actualizing an edge in an image obtained through the vehicular camera. When Hough transform of the edge image is performed, votes for a specified vote value of a linear component is evaluated in a $\rho$-$\theta$ space (Hough space). Presence of a recognition inhibiting factor of a lane mark on a road is determined by determining whether or not the votes of a specified vote value in a specified region denoting a standard travel lane of a vehicle in the real space is $\geq$ a threshold in the $\rho$-$\theta$ space.

7 Claims, 8 Drawing Sheets

VEHICLE TRAVEL SUPPORT DEVICE, VEHICLE, VEHICLE TRAVEL SUPPORT PROGRAM

PRIORITY CLAIM

The present application is based on and claims the priority benefit of Japanese Patent Application 2008-073842 filed on Mar. 21, 2008, the contents of which are incorporated herein by reference in its entirety.

BACKGROUND OF THE INVENTION

1. Field of the Invention

The present invention relates to a vehicle travel support device and the like which support a vehicle in traveling according to an image obtained through an imaging device mounted in the vehicle.

2. Description of the Related Art

There have been disclosed arts determining whether deposited snow is present on a road or not according to an image photographed by a camera (refer to Japanese Patent Laid-open No. 2005-275691 and No. 2005-308437).

However, according to the mentioned arts, a camera is fixed in the ambient of the road, and the presence of the deposited snow on the road is determined according to the presence of an image photographed preliminarily by the camera or images photographed at different times. Therefore, if an image photographed by a vehicular camera at the same position is not present, it is difficult to determine the presence of a recognition inhibiting factor which reduces recognition accuracy of a lane mark on a road where a vehicle is traveling for the first time. As an example of the recognition inhibiting factor of the lane mark, deposited snow or the like on the road may be given.

SUMMARY OF THE INVENTION

The present invention has been accomplished in view of the aforementioned problems, and it is therefore an object of the present invention to provide a vehicle travel support device and the like wherein the presence of a recognition inhibiting factor of a lane mark on a road where a vehicle is traveling can be determined with high accuracy irrespective of the presence of an imaging history by a vehicular camera from the same position.

A first aspect of the present invention provides a vehicle travel support device configured to recognize a travel environment of a vehicle according to an image indicating a situation in a travel direction of the vehicle which is obtained by an imaging device mounted in the vehicle. The vehicle travel support device of the present invention comprises: a first processing element configured to generate an edge image through performing on the image an edge extraction process which extracts a line segment with a luminance varying greater than a threshold in a scanning direction as an edge, a second processing element configured to perform a Hough transform process on the edge image generated by the first processing element and evaluate a vote value of a line segment in a $\rho$-$\theta$ space according to the Hough transform result, a third processing element configured to determine the presence of a recognition inhibiting factor which reduces recognition accuracy of a lane mark on a road where the vehicle is traveling according to whether or not the votes of a specified vote value evaluated by the second processing element in a specified region denoting a predicted travel region of the vehicle in the real space is equal to or greater than a threshold in the $\rho$-$\theta$ space, and a boundary of the specified region is set in such a way that the votes of the specified vote value is smaller than the threshold in the specified region for a road without the presence of the recognition inhibiting factor of the lane mark.

According to the vehicle travel support device of the first aspect of the present invention, the edge is extracted or actualized from an image obtained through the imaging device to generate the edge image. By performing the Hough transform process on the edge image, the votes of the specified vote value of a line segment in the $\rho$-$\theta$ space (Hough space) is evaluated. Thereafter, the presence of the recognition inhibiting factor of the lane mark on the road where the vehicle is traveling is determined according to whether or not the votes of the specified vote value in the specified region of the $\rho$-$\theta$ space is equal to or greater than the threshold. Since the specified region of the $\rho$-$\theta$ space is equivalent to a predicted travel region of the vehicle, the votes of the specified vote value in the specified region when the recognition inhibiting factor of the lane mark is present in the predicted travel region will be significantly different from that when the recognition inhibiting factor of the lane mark is absent in the predicted travel region. Accordingly, the presence of the recognition inhibiting factor of the lane mark on the road where the vehicle is traveling can be determined with high accuracy irrespective of the presence of the imaging history by the imaging device from the same position.

It should be noted that in the present invention a component "recognizes" information" means that the component performs a possible information process on a piece of information to prepare the piece of information ready for other information process, for example, the component searches the piece of information in a database or retrieves the piece of information from a storing unit such as a memory; measures, calculates, estimates, determines the piece of information according to an output signal from a sensor or the like; and stores in memory or the like the determined information or the like.

A second aspect of the present invention is dependent on the first aspect of the present invention, wherein the third processing element determines the presence the recognition inhibiting factor of the land mark on the road where the vehicle is traveling according to whether or not the votes of a first specified vote value serving as the specified vote value in a first specified region serving as the specified region defined according to $\rho$ value in the $\rho$-$\theta$ space is equal to or greater than a first threshold serving as the threshold.

According to the vehicle travel support device of the second aspect of the present invention, the presence of the recognition inhibiting factor of the lane mark on the road where the vehicle is traveling can be determined with high accuracy according to whether or not the votes of the specified vote value in the first specified region (=the specified region defined according to the $\rho$ value) is equal to or greater than the first threshold.

A third aspect of the present invention is dependent on the first aspect of the present invention, wherein the third processing element determines the presence of the recognition inhibiting factor of the land mark on the road where the vehicle is traveling according to whether or not the votes of a second specified vote value serving as the specified vote value in a second specified region serving as the specified region defined according to $\theta$ value in the $\rho$-$\theta$ space is equal to or greater than a second threshold serving as the threshold.

According to the vehicle travel support device of the third aspect of the present invention, the presence of the recognition inhibiting factor of the lane mark on the road where the vehicle is traveling can be determined with high accuracy according to whether or not the votes of the specified vote value in the second specified region (=the specified region defined according to the θ value) is equal to or greater than the second threshold.

A fourth aspect of the present invention is dependent on the first aspect of the present invention, wherein the vehicle travel support device suspends or stops the recognition process of the lane mark if the recognition inhibiting factor for the lane mark is determined to be present by the third processing element.

According to the vehicle travel support device of the fourth aspect of the present invention, when there is a high probability that the recognition accuracy of a lane mark is decreasing, the recognition process of the lane mark is prevented from being performed or being continued, thereby, circumstances such as the behavior of a vehicle is wrongly controlled due to the incorrect recognition of the lane mark can be avoided.

A fifth aspect of the present invention is dependent on the first aspect of the present invention, wherein the third processing element determines deposited snow or an object extended along a side of the road as the recognition inhibiting factor of the lane mark.

According to the vehicle travel support device of the fifth aspect of the present invention, the presence of deposited snow or an object extended along a side of the road can be determined as the recognition inhibiting factor of the lane mark on the road where the vehicle is traveling with high accuracy.

A vehicle of a sixth aspect of the present invention is provided with an imaging device and the vehicle travel support device of the first aspect of the present invention.

According to the vehicle of the sixth aspect, the presence of the recognition inhibiting factor of the lane mark on the road where the vehicle is traveling is recognized with high accuracy by the vehicle travel support device, thereby, on the basis of the recognition result, the operations of a vehicular apparatus can be appropriately controlled from the viewpoint of safe travel of the vehicle and the like.

A vehicle travel support program of a seventh aspect of the present invention causes a vehicular computer to function as the vehicle travel support device of the first aspect of the present invention.

According to the vehicle travel support program of the seventh aspect, the vehicular computer is caused to function as the vehicle travel support device recognizing the presence of the recognition inhibiting factor of the lane mark on the road where the vehicle is traveling with high accuracy.

DETAILED DESCRIPTION OF THE PREFERRED EMBODIMENTS

An embodiment of a vehicle travel support device and the like according to the present invention will be described with reference to the drawings.

Figure 1:
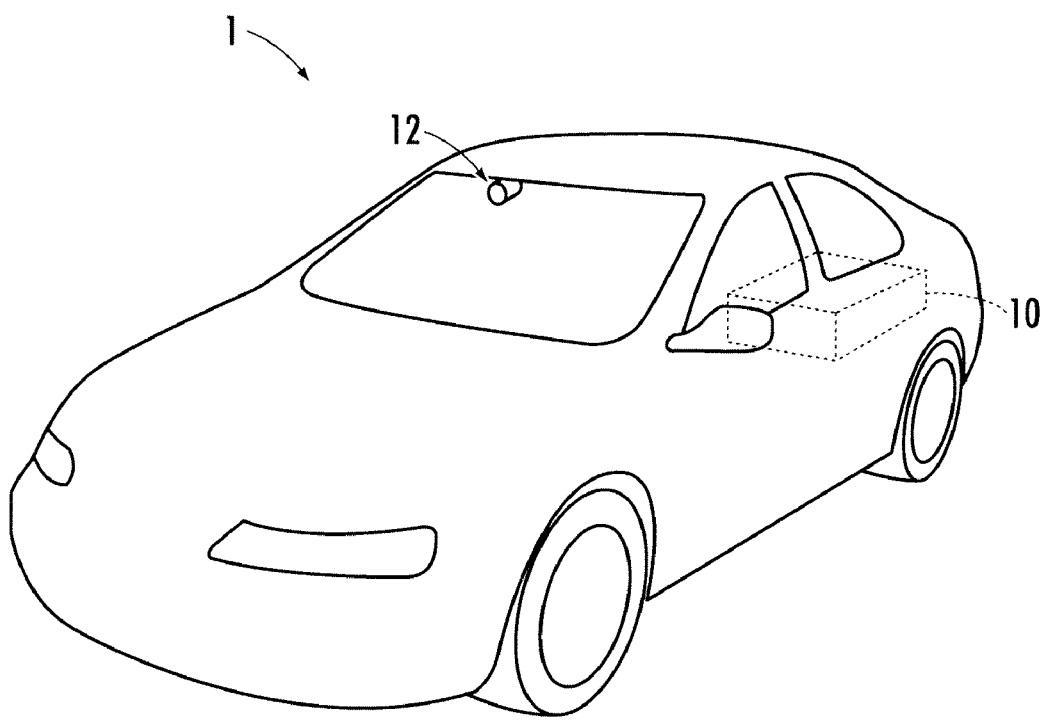
FIG. 1 is an explanatory diagram illustrating a vehicle of the present invention.
Figure 2:
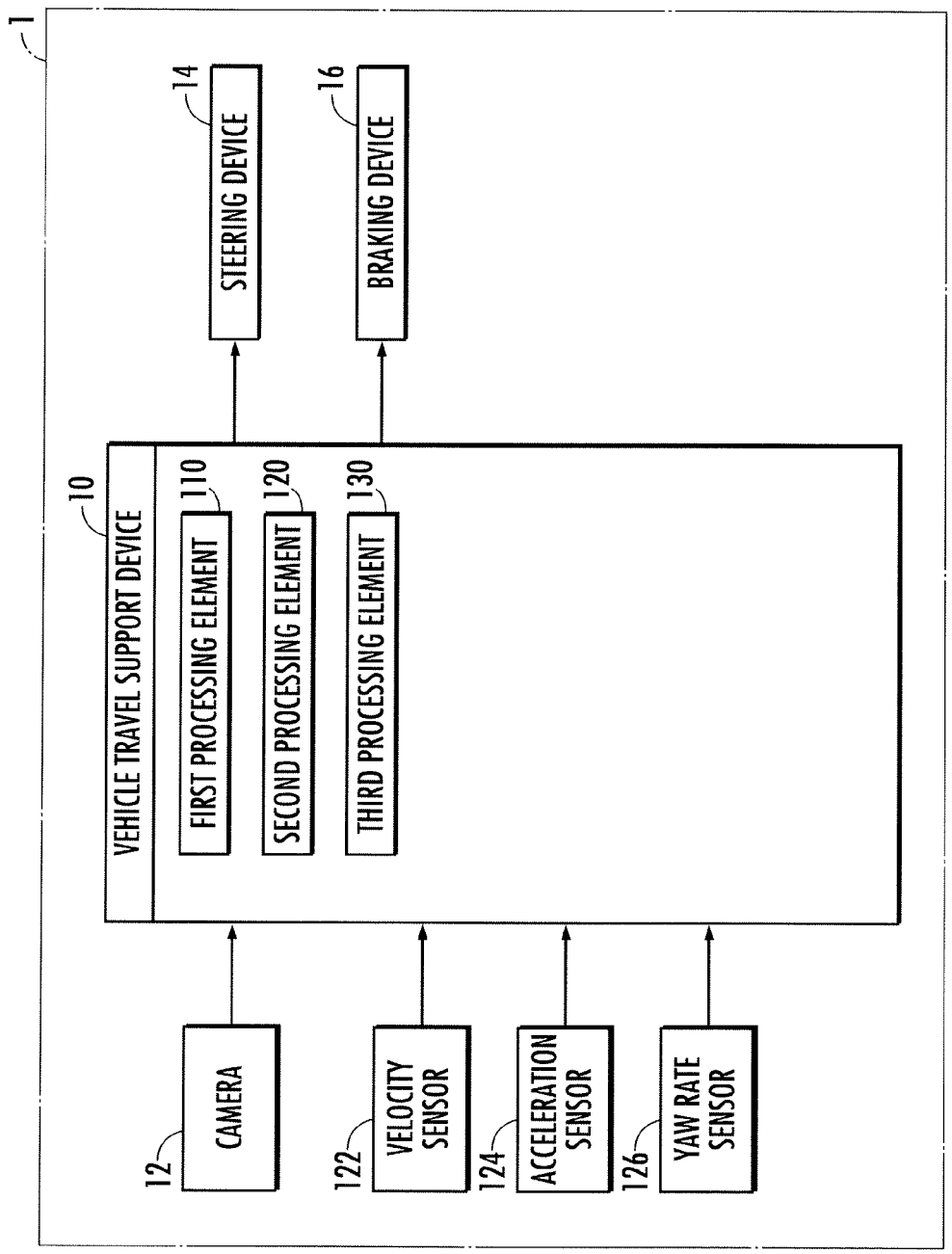
FIG. 2 is an explanatory diagram illustrating a vehicle travel support device of the present invention.

A vehicle (four-wheeled automobile) illustrated in FIG. 1 and FIG. 2 is mounted with a camera (imaging device) 12 such as a CCD camera or a near infrared camera and a vehicle travel support device 10. The camera 12 is fixed in the vehicular compartment to photograph the front side of the vehicle 1 through the windshield. It is acceptable to dispose the camera 12 at a front portion or the like of the vehicle 1 where appropriate.

The vehicle 1, as illustrated in FIG. 2, is further disposed with sensors such as a vehicular velocity sensor 122, an acceleration sensor 124 and a yaw rate sensor 126, a steering device 14 and a braking device 16. The vehicular velocity sensor 122, the acceleration sensor 124 and the yaw rate sensor 126 output signals related to velocity, acceleration and yaw rate of the vehicle 1, respectively.

The vehicle travel support device 10 is composed of a computer or an ECU (Electrical Control Unit composed of a CPU, a ROM, a RAM and electrical circuits such as an I/O circuit and an A/D conversion circuit and the like). Output signals from the camera 12, the velocity sensor 122 and the like are input into the vehicle travel support device 10. A vehicle travel support program is retrieved from memory by CPU, and various processes to be described hereinafter are performed according to the retrieved program. The program may be distributed or broadcasted from a server to the vehicle 1 through a network or a satellite at an arbitrary time and stored in the RAM or the like of the computer mounted in the vehicle.

The vehicle travel support device 10 performs a travel support control which supports the vehicle 1 to travel without departing from a travel region by controlling operations of either one or both of the steering device 14 and the braking device 16. The vehicle travel support device 10 is provided with a first processing element 110, a second processing element 120 and a third processing element 130.

The first processing element 110 generates an edge image through performing an edge extraction process which extracts or actualizes an edge on an image obtained with the camera 12. The second processing element 120 performs a Hough transform process on the edge image generated by the first processing element 110 and evaluates votes to a specified vote value of a line segment in a ρ-θ space according to the Hough transform result. The third processing element 130 determines that a recognition inhibiting factor of a lane mark on a road where the vehicle 1 is traveling is present if the votes of a specified vote value evaluated by the second processing element 120 in a specified region defined in the ρ-θ space is equal to or greater than a threshold.

The specified region defined in the ρ-θ space denotes a predicted travel region (a region with a part of or the entire part of thereof sandwiched by a pair of lane marks, for example, when the pair of lane marks are presumed to be present at both sides of the vehicle 1) of the vehicle 1 in the real space. A boundary of the specified region is set in such a way that the votes of the specified vote value is smaller than the threshold in the specified region for a road without the presence of the recognition inhibiting factor of the lane mark.

Functions of the vehicle 1 and the vehicle travel support device 10 with the aforementioned configurations will be described hereinafter.

Figure 3:
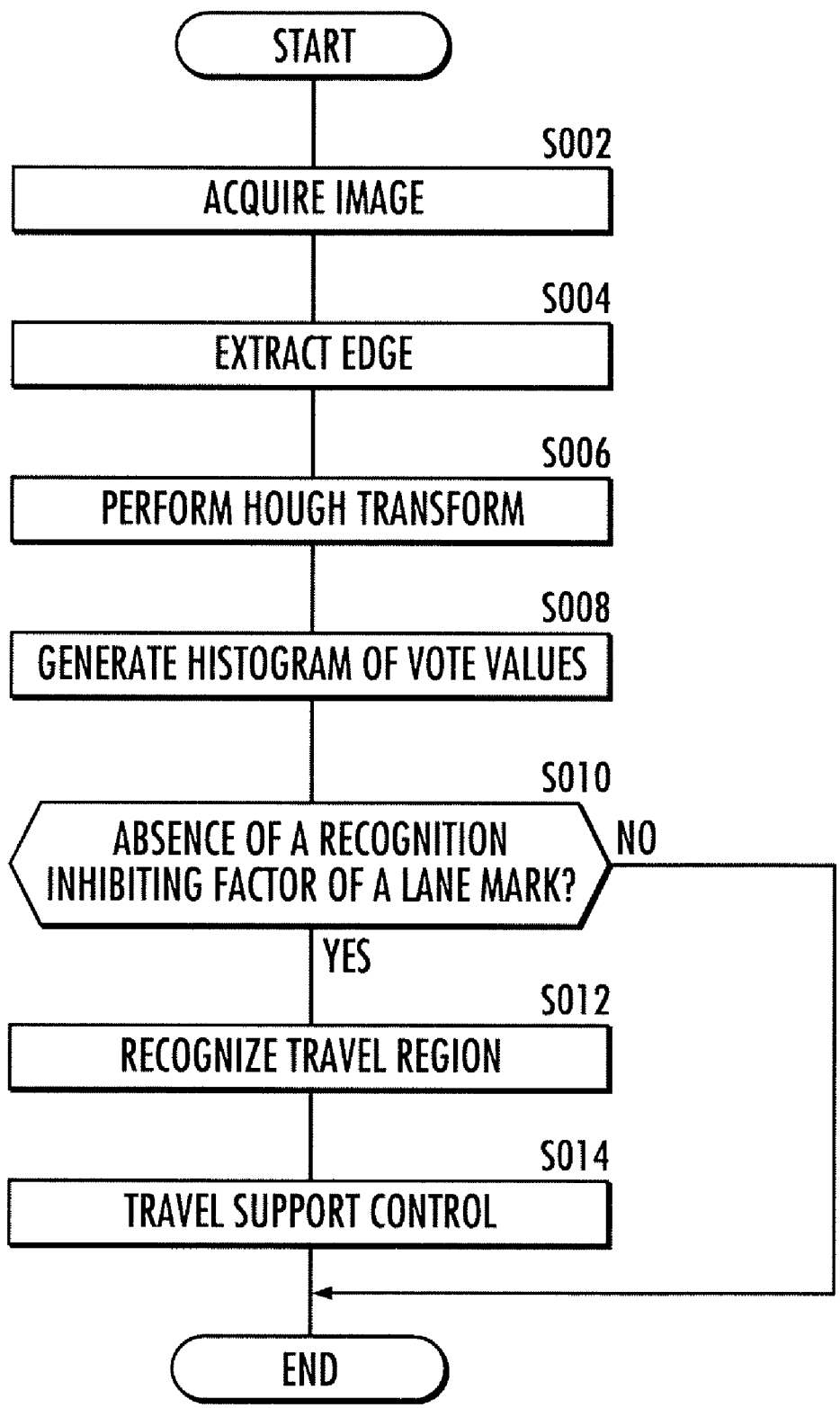
FIG. 3 is a flow chart illustrating functions of the vehicle travel support device of the present invention.
Figure 4:
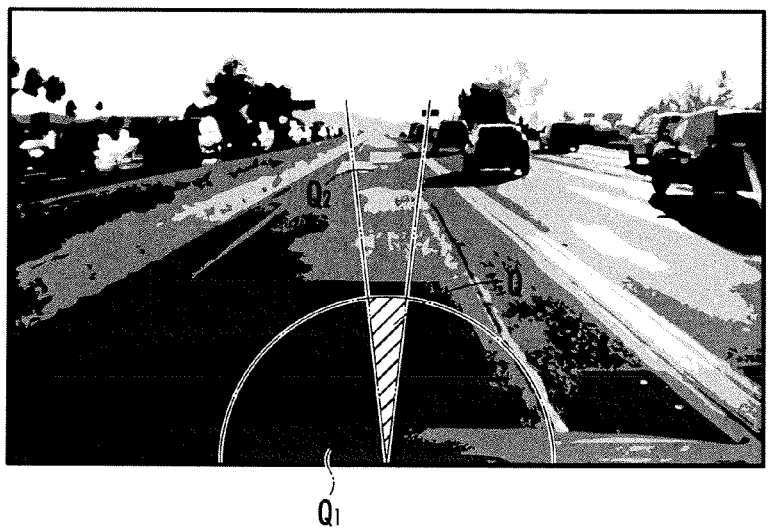
FIG. 4 is an explanatory diagram related to an edge extraction process and a Hough transform process when deposited snow is absent.
Figure 4:
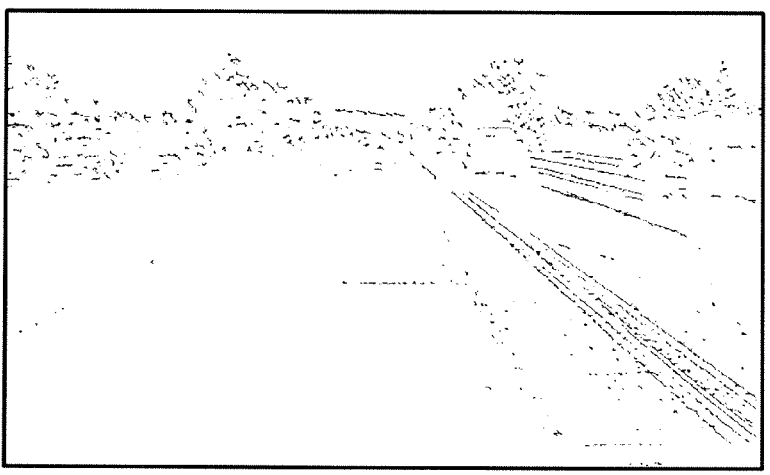
Figure 4:
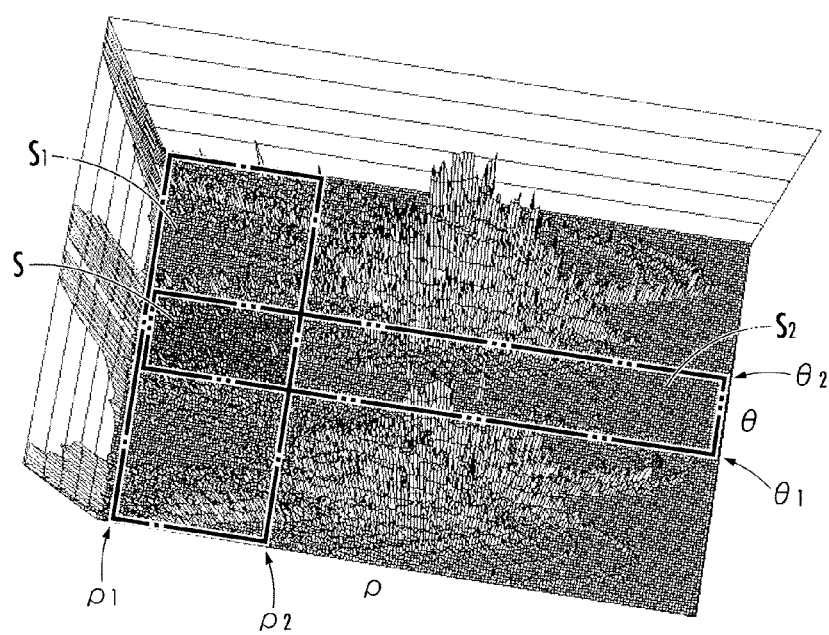
Figure 5:
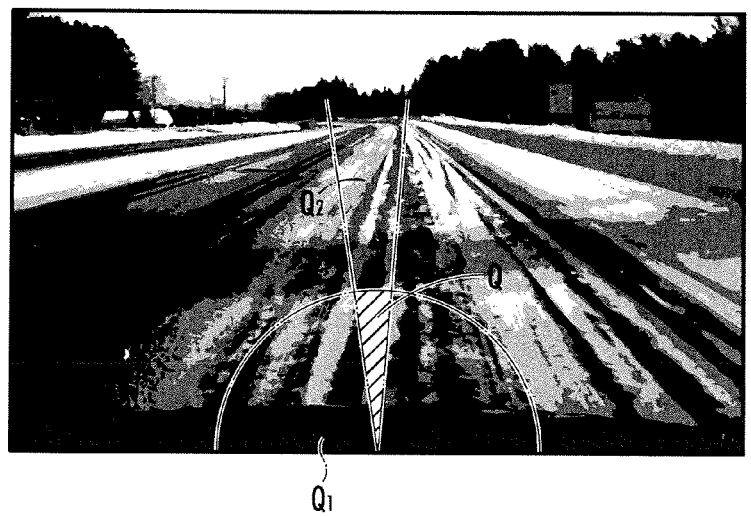
FIG. 5 is an explanatory diagram related to the edge extraction process and the Hough transform process when deposited snow is present.
Figure 5:
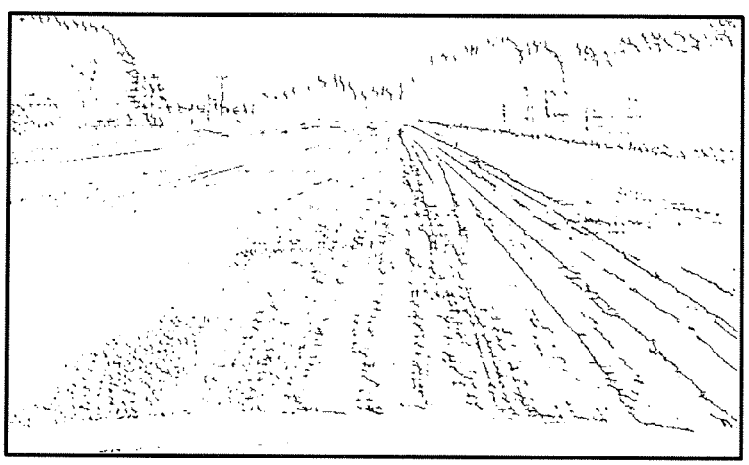
Figure 5:
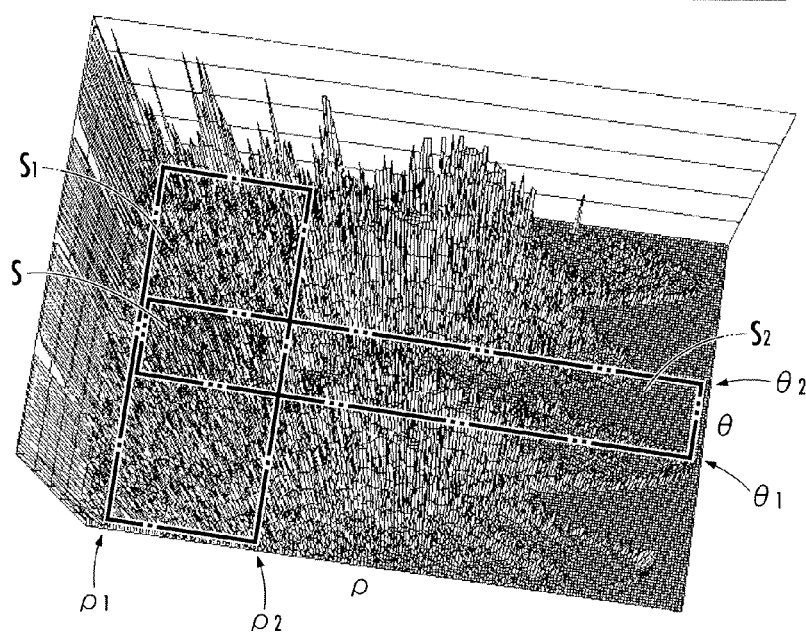
Figure 7:
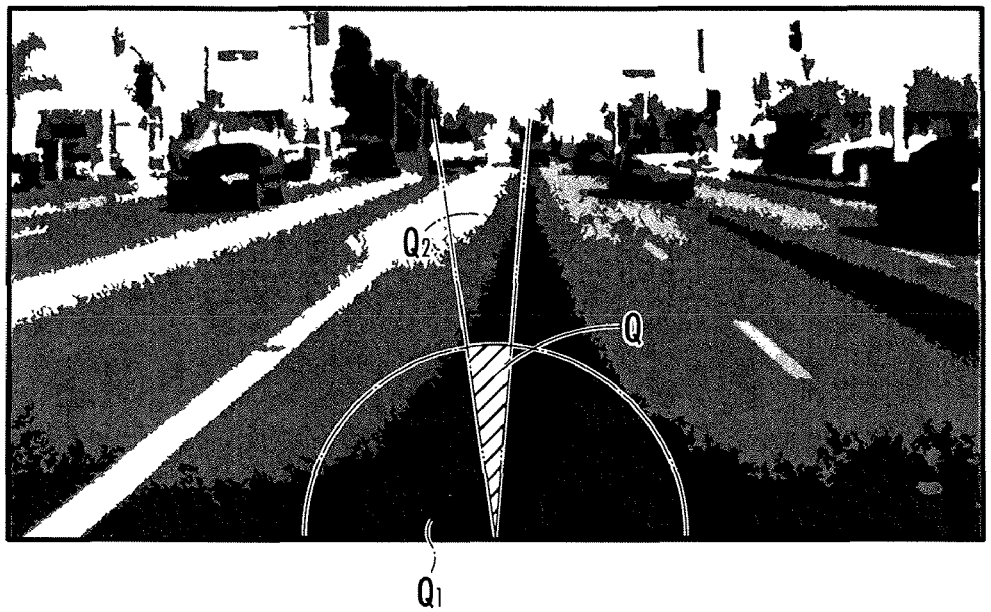
FIG. 7 is an explanatory diagram related to a photographed image where bushes are absent along sides of the road and the edge extraction process therefor.
Figure 7:
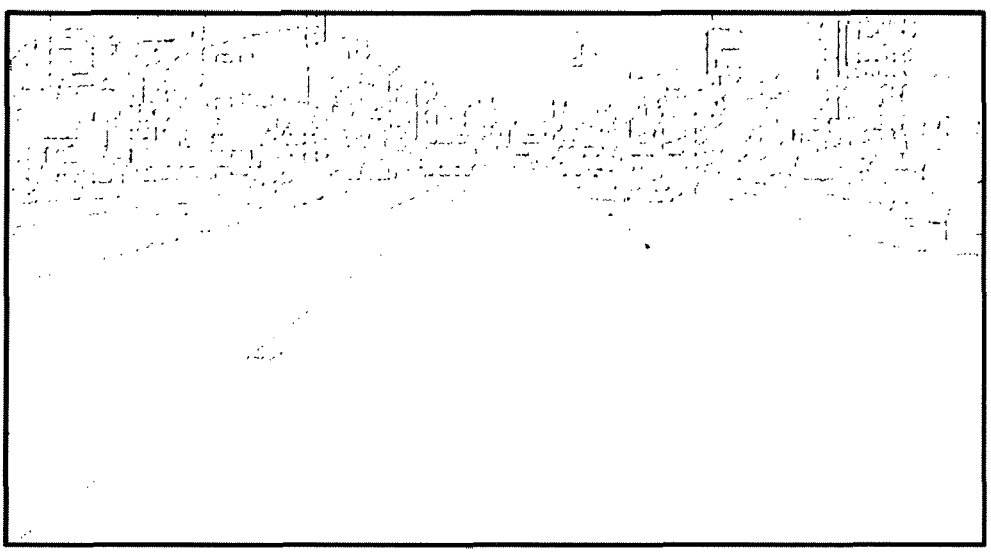
Figure 8:
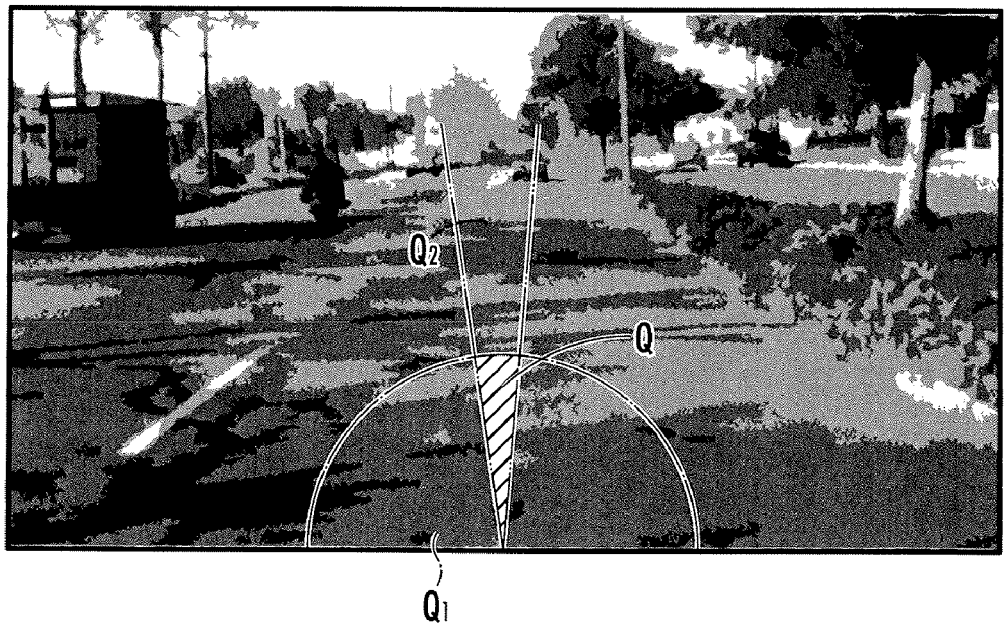
FIG. 8 is an explanatory diagram related to a photographed image where bushes are present by extending along sides of the road and the edge extraction process therefor.
Figure 8:
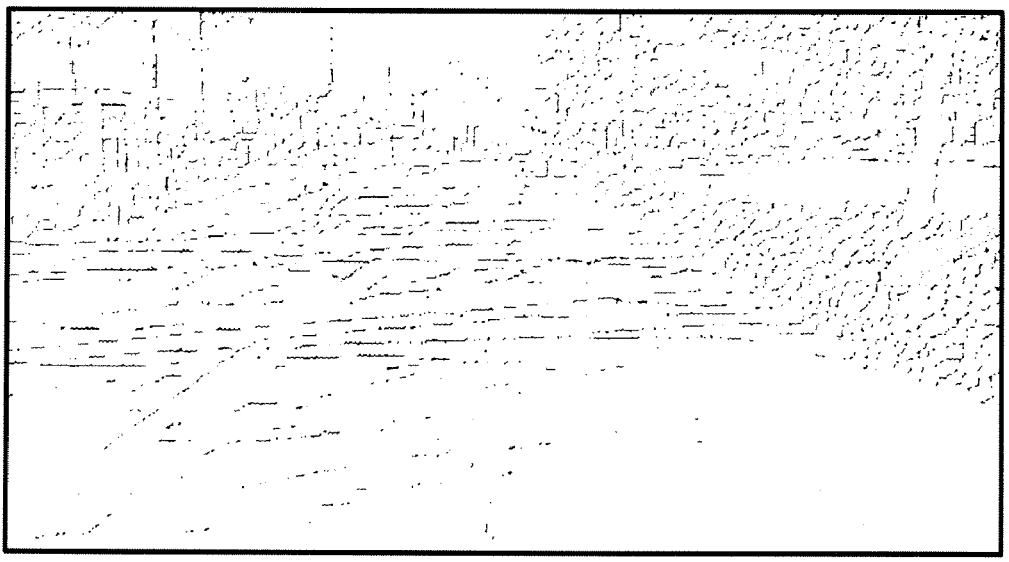

First, a digital image denoting a situation in front of or in the traveling direction of the vehicle is obtained through the camera 12 (FIG. 3/S002). For example, as illustrated in FIG. 4(a) or FIG. 5(a), an image of the road in front of the vehicle 1 is obtained. FIG. 4(a) illustrates a photographed image without snow deposited, while FIG. 5(a) illustrates a photographed image with snow deposited. As illustrated in FIG. 7(a) or FIG. 8(a), an image of a road extending in front of the vehicle 1 may be also obtained. FIG. 7(a) illustrates a photographed image where bushes are absent along sides of the road, while FIG. 8(a) illustrates a photographed image where bushes are present by extending along sides of the road.

Thereafter, an edge image is generated by the first processing element 110 with an edge actualized according to an edge extraction process performed on the digital image (FIG. 3/S004). For example, through performing the edge extraction process on the images illustrated in FIG. 4(a) and FIG. 5(a), respectively, the edge images are generated with edges (outlined portions) extracted or actualized as illustrated in FIG. 4(b) and FIG. 5(b), respectively. Similarly, through performing the edge extraction process on the images illustrated respectively in FIG. 7(a) and FIG. 8(a), the edge images are generated with edges (outlined portions) extracted or actualized as illustrated respectively in FIG. 7(b) and FIG. 8(b), respectively. The edge is referred to as a line segment composed of dots or pixels with luminance thereof varying greater than a threshold in a defined scanning direction. The edge may be recognized according to image processing methods disclosed in Japanese Patent Laid-open No. 2005-332104 and No. 2006-012191 and the like.

Subsequently, Hough transform process is performed by the second processing element 120 on the edge image generated by the first processing element 110 (FIG. 3/S006). For example, by performing the Hough transform process on the edge images illustrated respectively in FIG. 4(b) and FIG. 5(b), as illustrated in FIG. 4(c) and FIG. 5(c), respectively, the occurrence frequency of a line segment of a Hough transformed edge at an arbitrary coordinate of the $\rho$-$\theta$ space is evaluated as the vote value. Moreover, by performing the Hough transform process on the edge images illustrated respectively in FIG. 7(b) and FIG. 8(b), similar to that illustrated respectively in FIG. 4(c) and FIG. 5(c), the occurrence frequency of a line segment of a Hough transformed edge at an arbitrary coordinate of the $\rho$-$\theta$ space is evaluated as the vote value.

Figure 6:
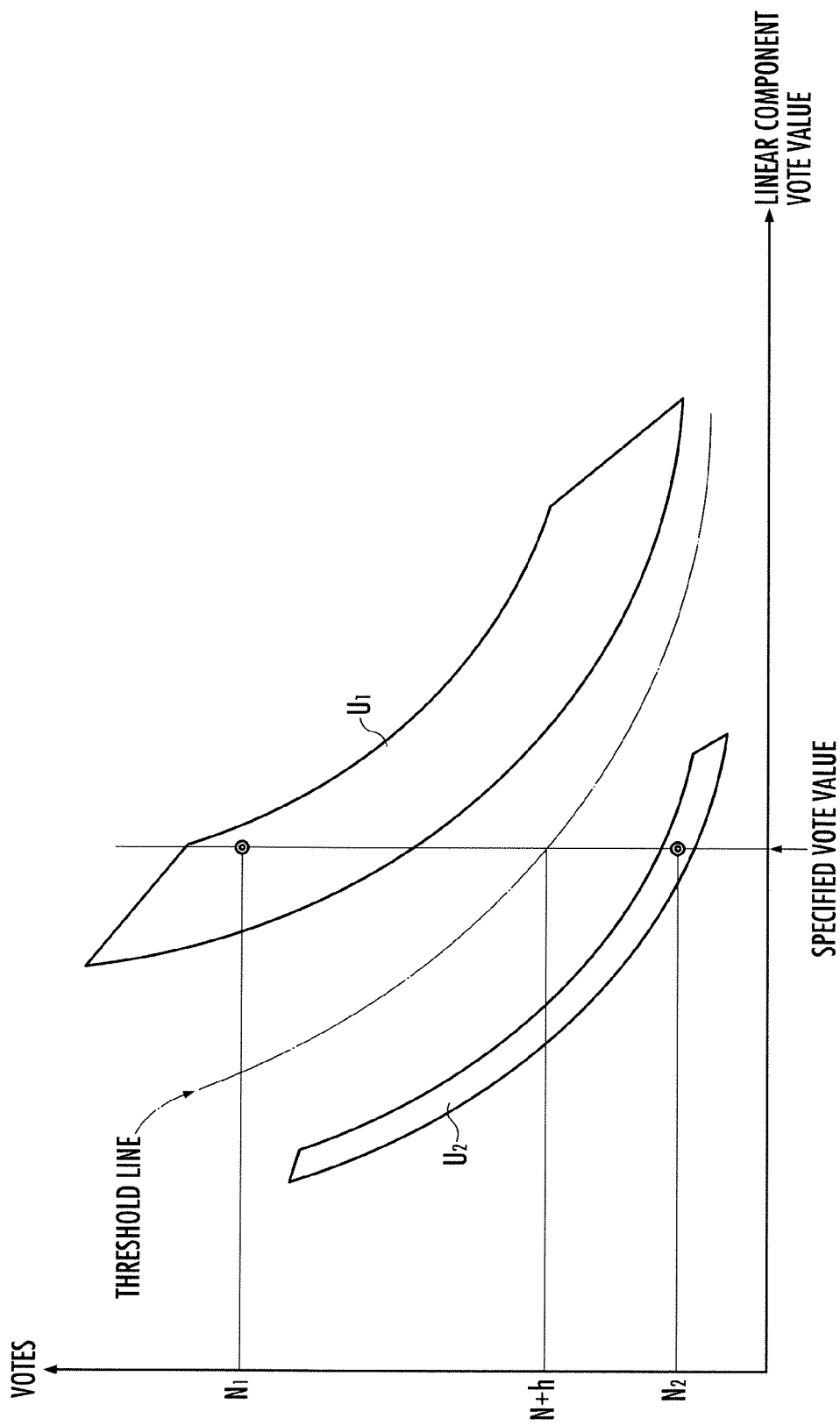
FIG. 6 is an explanatory diagram related to a relationship between vote values and votes of a line segment.

Then, a histogram denoting a relationship between the vote value in the specified region S defined in the $\rho$-$\theta$ space and the votes serving as the occurrence frequency of the vote value is generated by the second processing element 120 (FIG. 3/S008). Accordingly, for example as illustrated in FIG. 6, a curved line denoting the relationship between the vote value and the votes is drawn in such a way that a part of or the entire part of the curved line falls in either a first vote region $U_1$ which holds higher vote value and more votes than a threshold line (chain line) or a second vote region $U_2$ which holds lower vote value and less votes than the threshold line. As illustrated in FIG. 4(c) and FIG. 5(c), the specified region S is defined as an overlapped region (slash-lined) $S_1 \cap S_2$ between a first specified region (enclosed by a chain line) $S_1 = [\rho_1, \rho_2]$ defined by the $\rho$ value and a second specified region (enclosed by a two-dot chain line) $S_2 = [\theta_1, \theta_2]$ defined by the $\theta$ value. As illustrated in FIG. 4(c) and FIG. 5(c), there are a pair of regions which hold high vote values and are located out of the first specified region $S_1$ and the second specified region $S_2$. The pair of regions are mainly resulted from the Hough transform of edges of a pair of lane marks or wheel tracks. It should be noted that the first specified region $S_1$ or the second specified region $S_2$ may be defined separately as the specified region S. The shape of the specified region S is not limited to a rectangular shape; it may be of various shapes, such as an elliptical shape, a triangular shape, a trapezoidal shape or the like.

The boundary value of the specified region S is set in such a way that the votes of the specified vote value of the specified region S is equal to or greater than a threshold for a road with a recognition inhibiting factor of a lane mark such as deposited snow or bushes present by extending along sides of the road and the votes of the specified vote value of the specified region S is smaller than the threshold for a road without a recognition inhibiting factor of a lane mark.

Specifically, a lower limit $\rho_1$ and an upper limit $\rho_2$ of the first specified region $S_1$ are set in such a way that locations with a high vote value are relatively less in the first specified region $S_1$ for a road without a recognition inhibiting factor of a lane mark as illustrated in FIG. 4(c) while locations with a high vote value are relatively more in the first specified region $S_1$ for a road with a recognition inhibiting factor of a lane mark as illustrated in FIG. 5(c). In other words, the lower limit $\rho_1$ and the upper limit $\rho_2$ of the first specified region $S_1$ are set (for example, $\rho_1=0$, $\rho_2=0.3\rho_{max}$) to exclude the pair of regions with a high vote value described in the above mainly denoting the Hough transform result of edges of a pair of lane marks or wheel tracks. The first specified region $S_1$ in the $\rho$-$\theta$ space is equivalent to a straight line (line segment) passing through a semi-circular first image region $Q_1$ in an image photographed by the camera 12 as illustrated in FIG. 4(a), FIG. 5(a), FIG. 7(a) and FIG. 8(a), respectively, and consequently, equivalent to a real spatial region (a region neighboring the front side of the vehicle 1) corresponded to the first image region $Q_1$.

Similarly, a boundary value $\theta_1$ and a boundary value $\theta_2$ of the second specified region $S_2$ are set in such a way that locations with a high vote value are relatively less in the second specified region $S_2$ for a road without a recognition inhibiting factor of a lane mark as illustrated in FIG. 4(c) while locations with a high vote value are relatively more in the second specified region $S_2$ for a road with a recognition inhibiting factor of a lane mark as illustrated in FIG. 5(c) (for example, $\theta_1=\pi/6$, $\theta_2=5\pi/6$). In other words, the boundary value $\theta_1$ and the boundary value $\theta_2$ in the second specified region $S_2$ are set to exclude the pair of regions with a high vote value described in the above mainly denoting the Hough transform result of edges of a pair of lane marks or wheel tracks. The second specified region $S_2$ in the $\rho$-$\theta$ space is equivalent to a straight line (line segment) passing through a triangular second image region $Q_2$ in an image photographed by the camera 12 as illustrated in FIG. 4(a) and FIG. 5(a), respectively, and consequently, equivalent to a real spatial region (a region with most part thereof sandwiched between a pair of left and right lane marks when the pair of lane marks are presumed to be present) corresponded to the second image region $Q_2$.

Thereby, as illustrated in FIG. 6, for a road with a recognition inhibiting factor of a lane mark, the curved line denoting a relationship between the vote value and the votes can be drawn in a way that a part or the entire part of the curved line falls in the first vote region $U_1$ which holds higher vote value and more votes than the threshold line. On the other hand, for a road without snow deposited, the curved line denoting a relationship between the vote value and the votes can be drawn in a way that a part or the entire part of the curved line falls in the second vote region $U_2$ which holds lower vote value and less votes than the threshold line as illustrated in FIG. 6.

Thereafter, whether a recognition inhibiting factor of lane mark in the road where the vehicle 1 is traveling is present or not is determined by the third processing element 130 according to whether or not the votes of the specified vote value is equal to or greater than a threshold (FIG. 3/S010). For example, as illustrated in FIG. 6, when the votes $N_1$ of the specified vote value is equal to or greater than the threshold $N_{th}$, the deposited snow is determined to be present; on the other hand, when the votes $N_2$ is smaller than the threshold $N_{th}$, a recognition inhibiting factor of lane mark is determined to be absent. It should be noted that it is acceptable to determine a recognition inhibiting factor of lane mark not only according to whether or not the votes of one specified vote value is equal to or greater than a threshold but also according to whether or not the votes of each of a plurality of specified vote values is equal to or greater than the threshold.

Subsequently, if it is determined that a recognition inhibiting factor of lane mark is absent in the road (FIG. 3/S010 ... YES), the line segment extracted through the Hough transform is recognized as a constituent component of the lane marks or wheel tracks, and a traveling region is set with the left side and the right side thereof defined by the lane marks or the wheel tracks (FIG. 3/S012). Thereafter, a travel support control is performed to support the travel of the vehicle 1 to prevent the vehicle 1 from deviating from the travel region by controlling either or both operations of the steering device 14 and the braking device 16 (FIG. 3/S014). On the other hand, if it is determined that there is deposited snow on the road (FIG. 3/S010 ... NO), the setting of the travel region and the travel support control are suspended or stopped. In other words, when there is a high probability that the recognition accuracy of a lane mark is decreasing, the recognition process of the lane mark is prevented from being performed or being continued, thereby, circumstances such as the behavior of a vehicle is wrongly controlled due to the incorrect recognition of the lane mark can be avoided.

According to the vehicle travel support device 10 having the aforementioned functions, the edge image is generated through extracting or actualizing the edges in the image obtained from the camera (imaging device) 12 (refer to FIG. 3/S004, FIG. 4(b), FIG. 5(b), FIG. 7(b) and FIG. 8(b)). Then, the vote value of a line segment at an arbitrary point in the $\rho$-$\theta$ space (Hough space) is evaluated through Hough transforming the edge image (refer to FIG. 3/S006, FIG. 4(c) and FIG. 5(c)). Subsequently, the presence of a recognition inhibiting factor of a lane mark in a road where the vehicle 1 is traveling, such as deposited snow or an object such as grasses and trees or bushes extended along the sides of the road is determined according to whether or not the votes of the specified vote value in the specified region (refer to FIG. 4(c)) of the $\rho$-$\theta$ space is equal to or greater than the threshold (refer to FIG. 3/S010 and FIG. 6). Since the specified region S of the $\rho$-$\theta$ space is equivalent to the predicted travel region of the vehicle 1 defined by a pair of side lane marks or the like, the votes of the specified vote value in the specified region when the recognition inhibiting factor of the lane mark is present in the real spatial region will be significantly different from that when the recognition inhibiting factor of the lane mark is absent in the real spatial region. In detail, the first specified region $S_1$ in the $\rho$-$\theta$ space is equivalent to the straight line (line segment) passing through the semi-circular first image region $Q_1$ in an image photographed by the camera 12 as illustrated in FIG. 4(a), and consequently, equivalent to the real spatial region corresponded to the first image region $Q_1$; the second specified region $S_2$ in the $\rho$-$\theta$ space is equivalent to the straight line (line segment) passing through the triangular second image region $Q_2$ in an image photographed by the camera 12 as illustrated in FIG. 4(a), and consequently, equivalent to the real spatial region corresponded to the second image region $Q_2$. Thereby, the presence of a recognition inhibiting factor of a lane mark on a road where the vehicle 1 is traveling can be determined with high accuracy irrespective of the presence of an imaging history by the camera 12 from the same position.

What is claimed is:

1. A vehicle travel support device configured to recognize a travel environment of a vehicle according to an image indicating a situation in a travel direction of the vehicle which is obtained by an imaging device mounted in the vehicle, comprising:

a first processing element configured to generate an edge image through performing on the image an edge extraction process which extracts a line segment with a luminance varying greater than a threshold in a scanning direction as an edge, a second processing element configured to perform a Hough transform process on the edge image generated by the first processing element and evaluate a vote value of a line segment in a $\rho$-$\theta$ space according to the Hough transform result, and a third processing element configured to determine the presence of a recognition inhibiting factor which reduces recognition accuracy of a lane mark on a road where the vehicle is traveling according to whether or not the votes of a specified vote value evaluated by the second processing element in a specified region denoting a predicted travel region of the vehicle in the real space is equal to or greater than a threshold in the $\rho$-$\theta$ space, wherein a boundary of the specified region is set in such a way that the votes of the specified vote value is smaller than the threshold in the specified region for a road without the presence of the recognition inhibiting factor of the lane mark.

2. The vehicle travel support device according to claim 1, wherein the third processing element determines the presence of the recognition inhibiting factor of the land mark on the road where the vehicle is traveling according to whether or not the votes of a first specified vote value serving as the specified vote value in a first specified region serving as the specified region defined according to $\rho$ value in the $\rho$-$\theta$ space is equal to or greater than a first threshold serving as the threshold.

3. The vehicle travel support device according to claim 1, wherein the third processing element determines the presence of the recognition inhibiting factor of the land mark on the road where the vehicle is traveling according to whether or not the votes of a second specified vote value serving as the specified vote value in a second specified region serving as the specified region defined according to $\theta$ value in the $\rho$-$\theta$ space is equal to or greater than a second threshold serving as the threshold.

4. The vehicle travel support device according to claim 1, wherein the vehicle travel support device suspends or stops the recognition process of the lane mark if the recognition inhibiting factor for the lane mark is determined to be present by the third processing element.

5. The vehicle travel support device according to claim 1, wherein the third processing element determines deposited snow or an object extended along a side of the road as the recognition inhibiting factor of the lane mark.

6. A vehicle provided with an imaging device and the vehicle travel support device of claim 1.

7. A vehicle travel support program causing a vehicular computer to function as the vehicle travel support device of claim 1.

* * * * *